US010271056B2

(12) United States Patent
Miyahara et al.

(10) Patent No.: US 10,271,056 B2
(45) Date of Patent: Apr. 23, 2019

(54) ENCODING APPARATUS, ENCODING METHOD AND PROGRAM

(71) Applicants:Sony Corporation, Tokyo (JP); Sony Interactive Entertainment Inc., Tokyo (JP)

(72) Inventors: Nobuyoshi Miyahara, Tokyo (JP); Yuji Ando, Kanagawa (JP); Ryohei Okada, Tokyo (JP); Osamu Ota, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/602,531

(22) Filed: May 23, 2017

(65) Prior Publication Data

US 2017/0257633 A1    Sep. 7, 2017

Related U.S. Application Data

(63) Continuation of application No. 13/654,006, filed on Oct. 17, 2012, now Pat. No. 9,693,065.

(30) Foreign Application Priority Data

Oct. 24, 2011   (JP) ................................. 2011-232747

(51) Int. Cl.
*H04N 19/167*    (2014.01)
*H04N 19/172*    (2014.01)
(Continued)

(52) U.S. Cl.
CPC ......... *H04N 19/167* (2014.11); *H04N 19/107* (2014.11); *H04N 19/137* (2014.11); *H04N 19/172* (2014.11); *H04N 19/179* (2014.11)

(58) Field of Classification Search
None
See application file for complete search history.

(56) References Cited

U.S. PATENT DOCUMENTS 6,009,236 A  * 12/1999  Mishima .............. H04N 9/8042
                                                  375/E7.026
6,680,976 B1 *  1/2004  Chen .................. H04N 21/2383
                                                  375/240.12

(Continued)

FOREIGN PATENT DOCUMENTS

JP         06-217273 A       8/1994
JP         07-288808 A      10/1995
(Continued)

*Primary Examiner* — Reza Aghevli
(74) *Attorney, Agent, or Firm* — Wolf, Greenfield & Sacks, P.C.

(57) ABSTRACT

There is provided an encoding apparatus, including an intra-block determination section which determines that a prediction mode of a block is a forced intra-prediction mode, by a frequency based on a priority of each block of an image to be encoded, an encoding section which encodes the block, to which the prediction mode has been determined to be an intra-prediction mode by the intra-block determination section, with the intra-prediction mode, and a transmission section which transmits an encoded result of the image to be encoded obtained by the encoding section, and the prediction mode of the image.

11 Claims, 15 Drawing Sheets

(51) Int. Cl.
*H04N 19/107* (2014.01)
*H04N 19/137* (2014.01)
*H04N 19/179* (2014.01)

(56) References Cited

U.S. PATENT DOCUMENTS

| | | | |
|---|---|---|---|
| 8,902,982 B2 | 12/2014 | Oh et al. | |
| 9,473,746 B2 | 10/2016 | Masuura et al. | |
| 2010/0124274 A1* | 5/2010 | Cheok | H04N 19/176 375/240.03 |
| 2010/0135389 A1* | 6/2010 | Tanizawa | H04N 19/159 375/240.12 |
| 2010/0260261 A1* | 10/2010 | Kotaka | H04N 19/176 375/240.13 |
| 2010/0278236 A1* | 11/2010 | Yang | H04N 19/51 375/240.13 |
| 2011/0002391 A1* | 1/2011 | Uslubas | H04N 19/176 375/240.16 |
| 2011/0026597 A1* | 2/2011 | Tanaka | H04N 19/61 375/240.16 |
| 2011/0026600 A1* | 2/2011 | Kenji | H04N 19/70 375/240.24 |
| 2011/0026611 A1* | 2/2011 | Kenji | H04N 19/172 375/240.29 |
| 2011/0090960 A1* | 4/2011 | Leontaris | H04N 19/103 375/240.12 |
| 2011/0164677 A1* | 7/2011 | Lu | H04N 19/176 375/240.02 |
| 2011/0206125 A1* | 8/2011 | Chien | H04N 19/52 375/240.16 |
| 2011/0228840 A1* | 9/2011 | Yamori | H04N 19/513 375/240.03 |
| 2011/0243225 A1* | 10/2011 | Min | H04N 19/44 375/240.12 |
| 2012/0002864 A1 | 1/2012 | Kouno | |
| 2012/0183066 A1* | 7/2012 | Oh | H04N 19/132 375/240.13 |
| 2013/0028326 A1* | 1/2013 | Moriya | H04N 19/176 375/240.16 |
| 2013/0101043 A1 | 4/2013 | Miyahara et al. | |
| 2014/0267821 A1 | 9/2014 | Masuura et al. | |
| 2015/0023420 A1* | 1/2015 | Minezawa | H04N 19/86 375/240.13 |
| 2017/0257633 A1* | 9/2017 | Miyahara | H04N 19/172 |

FOREIGN PATENT DOCUMENTS

| | | |
|---|---|---|
| JP | 09-163378 A | 6/1997 |
| JP | 11-331839 A | 11/1999 |
| JP | 2000-201354 A | 7/2000 |
| JP | 2004-015501 A | 1/2004 |
| JP | 2007-214641 A | 8/2007 |
| JP | 2009-033423 A | 2/2009 |
| JP | 2011-035444 A | 2/2011 |
| JP | 2011-045138 A | 3/2011 |

\* cited by examiner

FIG. 13

| IntraPredMode [puPartIdx] | IntraPredType [puPartIdx] | IntraPredAngle [puPartIdx] |
|---|---|---|
| 0 | Intra_Vertical | 0 |
| 1 | Intra_Horizontal | 0 |
| 2 | Intra_DC | — |
| 3 | Intra_Vertical | −8 |
| 4 | Intra_Vertical | −4 |
| 5 | Intra_Vertical | +4 |
| 6 | Intra_Vertical | +8 |
| 7 | Intra_Horizontal | −4 |
| 8 | Intra_Horizontal | +4 |
| 9 | Intra_Horizontal | +8 |
| 10 | Intra_Vertical | −6 |
| 11 | Intra_Vertical | −2 |
| 12 | Intra_Vertical | +2 |
| 13 | Intra_Vertical | +6 |
| 14 | Intra_Horizontal | −6 |
| 15 | Intra_Horizontal | −2 |
| 16 | Intra_Horizontal | +2 |
| 17 | Intra_Horizontal | +6 |
| 18 | Intra_Vertical | −7 |
| 19 | Intra_Vertical | −5 |
| 20 | Intra_Vertical | −3 |
| 21 | Intra_Vertical | −1 |
| 22 | Intra_Vertical | +1 |
| 23 | Intra_Vertical | +3 |
| 24 | Intra_Vertical | +5 |
| 25 | Intra_Vertical | +7 |
| 26 | Intra_Horizontal | −7 |
| 27 | Intra_Horizontal | −5 |
| 28 | Intra_Horizontal | −3 |
| 29 | Intra_Horizontal | −1 |
| 30 | Intra_Horizontal | +1 |
| 31 | Intra_Horizontal | +3 |
| 32 | Intra_Horizontal | +5 |
| 33 | Intra_Horizontal | +7 |

FIG. 14

| dxIntra | dyIntra | IntraPredMode [puPartIdx] | Name of IntraPredMode [puPartIdx] | xyAxisFlage of IntraPredMode [puPartIdx] | PredGroup of IntraPredMode [puPartIdx] |
|---|---|---|---|---|---|
| — | — | 0 | Intra_Vertical | — | 0 |
| — | — | 1 | Intra_Horizontal | — | 1 |
| — | — | 2 | Intra_DC | — | 2 |
| — | — | 3 | Intra_Plane | — | 2 |
| 1 | −1 | 4 | Intra_Angle0 | 0 | 3 |
| 1 | 1 | 5 | Intra_Angle1 | 0 | 4 |
| 1 | 2 | 6 | Intra_Angle2 | 0 | 5 |
| 2 | 1 | 7 | Intra_Angle3 | 0 | 6 |
| 1 | −2 | 8 | Intra_Angle4 | 0 | 7 |
| 2 | −1 | 9 | Intra_Angle5 | 1 | 8 |
| 2 | −11 | 10 | Intra_Angle6 | 0 | 0 |
| 5 | −7 | 11 | Intra_Angle7 | 0 | 3 |
| 10 | −7 | 12 | Intra_Angle8 | 0 | 3 |
| 11 | 3 | 13 | Intra_Angle9 | 0 | 6 |
| 4 | 3 | 14 | Intra_Angle10 | 0 | 5 |
| 1 | 11 | 15 | Intra_Angle11 | 0 | 0 |
| 1 | −1 | 16 | Intra_Angle12 | 1 | 3 |
| 12 | −3 | 17 | Intra_Angle13 | 1 | 8 |
| 1 | −11 | 18 | Intra_Angle14 | 0 | 0 |
| 1 | −7 | 19 | Intra_Angle15 | 0 | 7 |
| 3 | −10 | 20 | Intra_Angle16 | 0 | 3 |
| 5 | −6 | 21 | Intra_Angle17 | 0 | 3 |
| 7 | −6 | 22 | Intra_Angle18 | 0 | 3 |
| 7 | −4 | 23 | Intra_Angle19 | 0 | 8 |
| 11 | 1 | 24 | Intra_Angle20 | 0 | 1 |
| 6 | 1 | 25 | Intra_Angle21 | 0 | 1 |
| 8 | 3 | 26 | Intra_Angle22 | 0 | 6 |
| 5 | 3 | 27 | Intra_Angle23 | 0 | 5 |
| 5 | 7 | 28 | Intra_Angle24 | 0 | 5 |
| 2 | 7 | 29 | Intra_Angle25 | 0 | 5 |
| 5 | −7 | 30 | Intra_Angle26 | 1 | 3 |
| 4 | −3 | 31 | Intra_Angle27 | 1 | 3 |
| Bi−linear mode | | 32 | Intra_Bilinear | — | 2 |

ENCODING APPARATUS, ENCODING METHOD AND PROGRAM

CROSS REFERENCE TO RELATED APPLICATIONS

This application is a continuation of and claims the benefit under 35 U.S.C. §120 of U.S. patent application Ser. No. 13/654,006, titled "ENCODING APPARATUS, ENCODING METHOD AND PROGRAM," filed on Oct. 17, 2012, which claims the benefit of Japanese Priority Patent Application JP 2011-232747, filed on Oct. 24, 2011, the entire contents of each of which is incorporated herein by reference.

BACKGROUND

The present disclosure relates to an encoding apparatus, encoding method and program, and more specifically to an encoding apparatus, encoding method and program that can quickly return a block with a high degree of importance of a decoded image in the case where an error occurs.

AVC (Advanced Video Coding), HEVC (High Efficiency Video Coding) and the like are encoding systems of an image. Intra-encoding or inter-encoding are encoding methods of such encoding systems. Intra-encoding is encoding performed using pixels within the same screen, and an encoded amount of intra-encoding is generally increased. On the other hand, inter-encoding is encoding performed between screens using pixels of adjacent screens, and the encoded amount of inter-encoding is less than that of intra-encoding.

The encoding apparatus selects an encoding method in a frame unit or macro block unit, based on a cost function value when an image is encoded by each of the encoding methods. Information showing the selected encoding method is included in a bit stream along with the encoded image as a frame type (picture type) or a macro block type.

On the other hand, an encoding apparatus, such as a wall mounting type television receiver, wirelessly transmits a bit stream of an HD (High Definition) video of a television broadcast from a position separated from a display device.

A wireless LAN (Local Area Network), a UWB (Ultra Wide Band) or the like in accordance with standards, such as millimeter waves using a 60 GHz bandwidth or IEEE (Institute of Electrical and Electronic Engineers) 802.11n using a 5 GHz bandwidth, are wireless transmission systems of an HD video. Transmission systems of a 5 GHz bandwidth are widespread in the market, and attention has been drawn to wireless LAN in accordance with IEEE802.11n standards, which have a merit of cost, as a wireless transmission system of an HD video. In the case where a wireless LAN in accordance with IEEE802.11n standards is adopted, while a main flow of 100 Mpbs or less is a transmission rate, an HD video is transmitted by compression encoding so that a bit rate of the HD video is several Gbps in a state of non-compression.

Further, while not limited to an HD video, there are encoding apparatuses which transmit SD (Standard Definition) video and a bit stream of small-sized video from the SD video. A high speed server or the like is such an encoding apparatus, which is arranged in a remote place, and which delivers a screen of an application (an application for a game or the like) to a client so as to enable operation of the application during operation by the client. The client provides feedback of the operation contents for the client to the server in a short time interval.

In the case where a bit stream, such as that mentioned above, is transmitted from an encoding apparatus through a transmission route, packet loss may occur on the transmission route, and a reception error may occur at the receiving side. In the case where encoding is performed in a frame unit, and when a reception error occurs in a frame, normal image data of this frame may not be able to be obtained at the receiving side. Therefore, as long as the encoding method of subsequent frames is inter-encoding, normal image data may not be able to be decoded. In the case where encoding is performed not in a frame unit but in a slice unit, while the generation unit of a reception error is a slice unit, in a manner similar to the case where encoding is performed in a frame unit, as long as the encoding method of slices of subsequent frames where the reception error occurs is inter-encoding, normal image data may not be able to be decoded.

Here, normal image data is quickly decoded in the case where a reception error occurs, and a method, which intra-encodes an encoding method of a prescribed slice or macro block of each screen, is a method which returns to a normal screen (for example, refer to JP 2011-35444A).

SUMMARY

However, the method disclosed in JP 2011-35444A does not depend on a degree of importance of an image, and an encoding method of a prescribed slice or macro block performs intra-encoding at a prescribed frame cycle. Accordingly, even if there is a block with a high degree of importance, the return timing of a decoded image of this block will not be different from that of a block with a low degree of importance.

The present disclosure is performed by considering such a situation, and can quickly return a block with a high degree of importance of a decoded image in the case where an error occurs.

According to an embodiment of the present disclosure, there is provided an encoding apparatus which includes an intra-block determination section which determines that a prediction mode of a block is a forced intra-prediction mode, by a frequency based on a priority of each block of an image to be encoded, an encoding section which encodes the block, to which the prediction mode has been determined to be an intra-prediction mode by the intra-block determination section, with the intra-prediction mode, and a transmission section which transmits an encoded result of the image to be encoded obtained by the encoding section, and the prediction mode of this image.

According to another embodiment of the present disclosure, there is provided an encoding method and a program corresponding to the encoding apparatus of the above embodiment of the present disclosure.

This embodiment of the present disclosure provides determining that a prediction mode of a block is a forced intra-prediction mode, by a frequency based on a priority of each block of an image to be encoded, encoding the blocks, where the prediction mode has been determined to be an the intra-prediction mode, with the intra-prediction mode, and transmitting an encoded result of the image to be encoded, and the prediction mode of this image.

According to the embodiments of the present disclosure, it is possible to quickly return a block with a high degree of importance of a decoded image in the case where an error occurs.

BRIEF DESCRIPTION OF THE DRAWINGS

FIG. 13 is a figure showing an example of an intra-prediction mode of an HEVC system;

FIG. 14 is a figure further showing the example of an intra-prediction mode of an HEVC system.

DETAILED DESCRIPTION OF THE EMBODIMENT(S)

Figure 1:
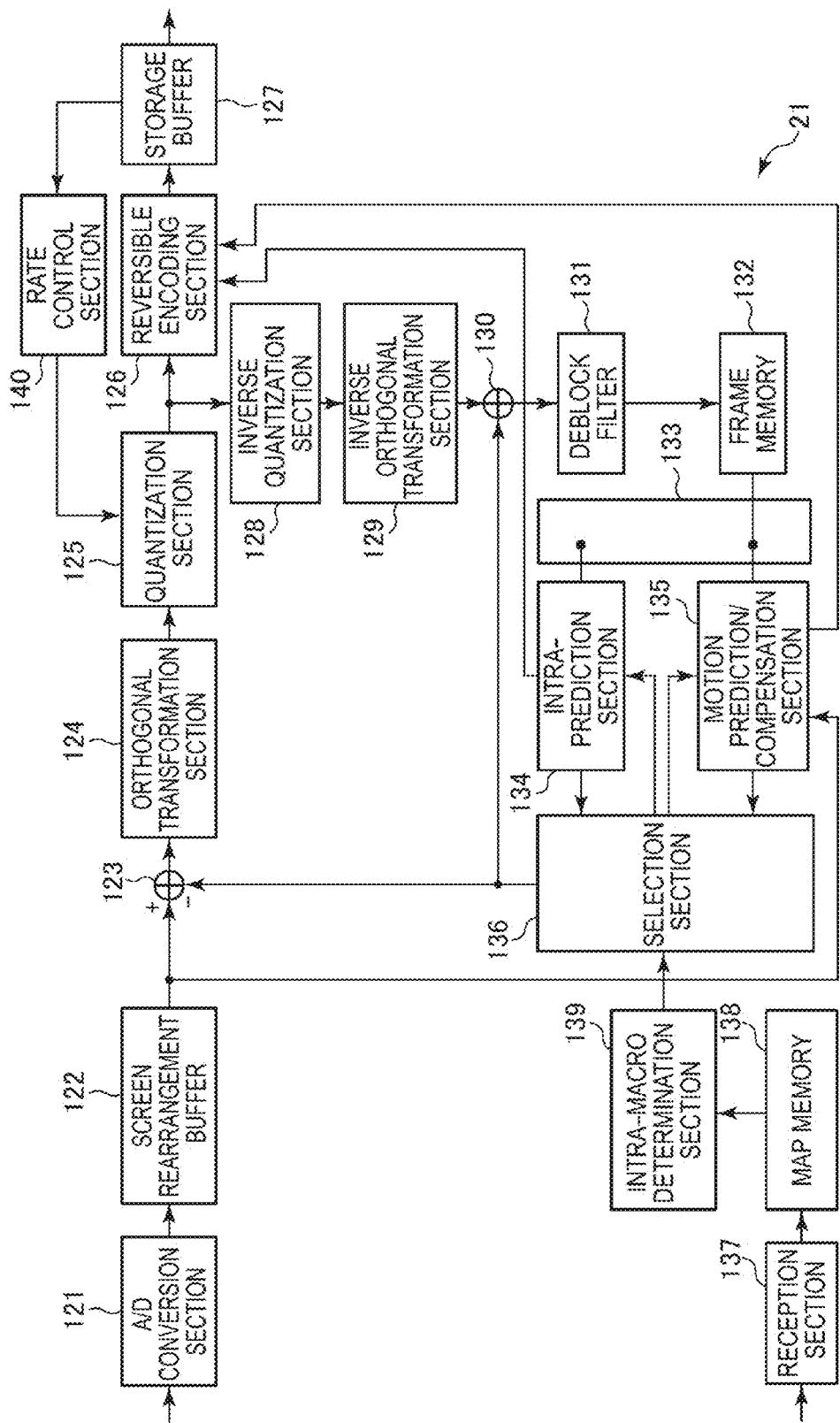
FIG. 1 is a figure showing a configuration example of a first embodiment of an encoding apparatus applicable to the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

<The First Embodiment>

[Configuration Example of the Encoding Apparatus]

FIG. 1 is a figure showing a configuration example of a first embodiment of an encoding apparatus applicable to the present disclosure.

The encoding apparatus 21 of FIG. 1 includes an A/D conversion section 121, a screen rearrangement buffer 122, a computation section 123, an orthogonal transformation section 124, a quantization section 125, a reversible encoding section 126, a storage buffer 127, an inverse quantization section 128, an inverse orthogonal transformation section 129, an addition section 130, a deblock filter 131, a frame memory 132, a switch 133, an intra-prediction section 134, a motion prediction/compensation section 135, a selection section 136, a reception section 137, a map memory 138, an intra-macro determination section 139, and a rate control section 140. The encoding apparatus 21 encodes image data, input to be encoded, by an AVC system, and transmits a bit stream obtained as a result.

Specifically, the A/D conversion section 121 of the encoding apparatus 21 performs A/D conversion of image data of a frame unit to be encoded, and outputs and stores the image data in the screen rearrangement buffer 122. The screen rearrangement buffer 122 rearranges image data of the frame unit in an order of the stored display into an order for encoding, according to a GOP (Group of Pictures) structure, and outputs the image data to the computation section 123 and the motion prediction/compensation section 135.

The computation section 123 functions as an encoding section, and encodes image data to be encoded by computing a difference between the image data to be encoded output from the screen rearrangement buffer 122 and predictive image data supplied from the selection section 136. Specifically, the computation section 123 subtracts the predictive image data supplied from the selection section 136 from the image data to be encoded output from the screen rearrangement buffer 122. The computation section 123 outputs the image data obtained as a result of the subtraction to the orthogonal transformation section 124 as residual information. Note that in the case where predictive image data is not supplied from the selection section 136, the computation section 123 outputs image data read out from the screen rearrangement buffer 122 to the orthogonal transformation section 124 as residual information without change.

The orthogonal transformation section 124 applies an orthogonal transformation, such as a discrete cosine transformation or a Karhunen-Loeve transformation, to the residual information from the computation section 123, and supplies a coefficient obtained as a result to the quantization section 125.

The quantization section 125 quantizes the coefficient supplied from the orthogonal transformation section 124. The quantized coefficient is input to the reversible encoding section 126.

The reversible encoding section 126 obtains encoded data by performing reverse encoding, such as variable-length encoding (for example, CAVLC (Context-Adaptive Variable Length Coding) or the like) or arithmetic encoding (for example, CABAC (Context-Adaptive Binary Arithmetic Coding) or the like), of the quantized coefficient supplied from the quantization section 125. Further, the reversible encoding section 126 performs reverse encoding of the intra-prediction mode information supplied from the intra-prediction section 134, or the inter-prediction mode information supplied from the motion prediction/compensation section 135, and sets the information obtained as a result as header information to be added to the encoded data. The reversible encoding section 126 supplies and stores the encoded data, to which the header information obtained as a result of the reverse encoding is to be added, in the storage buffer 127 as a bit stream.

The storage buffer 127 temporally stores the bit stream supplied from the reversible encoding section 126. The storage buffer 127 functions as a transmission section, and transmits the stored bit stream to a decoding apparatus (not shown) through a transmission route.

Further, the quantized coefficient output by the quantization section 125 is input to the inverse quantization section 128, and after inverse quantization is performed, is supplied to the inverse orthogonal transformation section 129.

The inverse orthogonal transformation section 129 applies an inverse orthogonal transformation, such as an inverse discrete cosine transformation or an inverse Karhunen-Loeve transformation, to the coefficient supplied from the inverse quantization section 128, and supplies the residual information obtained as a result to the addition section 130.

The addition section 130 obtains partially decoded image data by adding the predictive image data supplied from the selection section 136 to the residual information of the encoded data to be decoded supplied from the inverse orthogonal transformation section 129. Note that in the case where predictive image data is not supplied from the selection section 136, the addition section 130 sets the residual information supplied from the inverse orthogonal transformation section 129 as partially decoded image data. The addition section 130 supplies the partially decoded image data to the deblock filter 131.

The deblock filter 131 removes block distortions by filtering the partially decoded image data supplied from the addition section 130. The deblock filter 131 supplies and stores the image data obtained as a result in the frame memory 132. The image data stored in the frame memory 132 is output to the intra-prediction section 134 or the motion prediction/compensation section 135 through the switch 133 as reference image data.

The intra-prediction section 134 generates predictive image data by performing intra-prediction of all the candidate intra-prediction modes, by using the reference image data supplied from the frame memory 132 through the switch 133. However, this intra-prediction does not refer to pixels other than the macro block to be predicted. For example, in an intra-prediction block at the boundary of a macro block, intra-prediction is performed using a prescribed value as the pixel values of reference pixels.

Further, the intra-prediction section 134 calculates a cost function value (details will be described later) for all the candidate intra-prediction modes. Then, the intra-prediction section 134 determines that an intra-prediction mode, to which the cost function value is minimized, is the most suitable intra-prediction mode. The intra-prediction section 134 supplies the predictive image data generated by the most suitable intra-prediction mode, and the corresponding cost function value, to the selection section 136. In the case where the selection of the predictive image data generated by the most suitable prediction mode from the selection section 136 has been notified, the intra-prediction section 134 supplies intra-prediction information showing the most suitable intra-prediction mode or the like to the reversible encoding section 126.

Note that the cost function value may be an RD (Rate Distortion) cost, and is calculated, for example, based on either a High Complexity mode technique or a Low Complexity mode technique, such as that provided by a JM (Joint Model) that is reference software in an H.264/AVC system.

Specifically, in the case where a High Complexity mode is adopted as the calculation technique of the cost function value, provisional reverse encoding is performed for all the candidate prediction modes, and a cost function value, represented by the following Equation (1), is calculated for each of the prediction modes.

$$\text{Cost(Mode)}=D+\lambda*R \quad (1)$$

D is a difference (distortion) between the original image and the decoded image, R is a generation encoded amount including the coefficient of the orthogonal transformation, and λ is a Lagrange multiplier given as a function of a quantization parameter QP.

On the other hand, in the case where a Low Complexity mode is adopted as the calculation technique of the cost function value, calculation of a header bit, such as information showing the generation of the decoded image and the prediction mode, is performed for all the candidate prediction modes, and a cost function value, represented by the following Equation (2), is calculated for each of the prediction modes.

$$\text{Cost(Mode)}=D+\text{QPtoQuant(QP)}*\text{Header\_Bit} \quad (2)$$

D is a difference (distortion) between the original image and the decoded image, Header_Bit is the header bit for the prediction modes, and QPtoQuant is a function given as a function of a quantization parameter QP.

In a Low Complexity mode, since only a decoded image has to be generated for all prediction modes, and it is not necessary to perform reverse encoding, the computation amount can be reduced. Here, a High Complexity mode can be adopted as the calculation technique of the cost function value.

The motion prediction/compensation section 135 generates predictive image data by performing a motion prediction/compensation process of all the candidate intra-prediction modes, based on the image data supplied from the screen rearrangement buffer 122 and the reference image data supplied from the frame memory 132 through the switch 133. However, in this movement prediction/amending process, a macro block at a position similar to that of the immediately previous frame is set as the reference image data.

Note that the inter-prediction mode is information which shows the size of a block to be inter-predicted, a prediction direction, and a reference index. The prediction direction includes a prediction of a forward position which uses a reference image whose display time is faster than that of an image to be inter-predicted (L0 prediction), a prediction of a backward direction which uses a reference image whose display time is slower than that of an image to be inter-predicted (L1 prediction), and a prediction of both directions, in which a reference image with a display time faster than an image to be inter-predicted, and a reference image with a display time slower than an image to be inter-predicted, are both used (Bi-prediction). Further, the reference index is a number for specifying the reference image, and, for example, the more the reference index of the image approaches the image to be inter-predicted, the more the number decreases.

Further, the motion prediction/compensation section 135 calculates the cost function value for all the candidate inter-prediction modes. Then, the motion prediction/compensation section 135 determines that an inter-prediction mode, to which the cost function value is minimized, is the most suitable inter-prediction mode. The motion prediction/compensation section 135 supplies the predictive image data generated by the most suitable inter-prediction mode, and the corresponding cost function value, to the selection section 136. In the case where the selection of the predictive image data generated by the most suitable prediction mode from the selection section 136 has been notified, the motion prediction/compensation section 135 supplies the inter-prediction information showing the most suitable inter-prediction mode, and a motion vector corresponding to this most suitable inter-prediction mode, to the reversible encoding section 126.

The selection section 136 determines that either the most suitable intra-prediction mode or the most suitable inter-prediction mode is the most suitable prediction mode, based on the forced intra-macro information from the intra-macro determination section 139, and the cost function value from the intra-prediction section 134 and the motion prediction/compensation section 135. Note that the forced intra-macro information is information showing the position of a macro block where the forced prediction mode is set as the intra-prediction mode (hereinafter, called a forced intra-macro block).

The selection section 136 supplies the predictive image data of the most suitable prediction mode to the computation section 123 and the addition section 130. Further, the selection section 136 notifies the selection of the predictive image data of the most suitable prediction mode to the intra-prediction section 134 or the motion prediction/compensation section 135.

The reception section 137 receives an input of the priority of each macro block from a user. For example, a value of 1 to 30 is input as the priority, so that as the degree of importance increases for a macro block which is preferentially made a forced intra-macro block, the value decreases. The reception section 137 supplies this priority to the map memory 138.

The map memory 138 stores the priority supplied from the reception section 137 for each macro block. Further, the map memory 138 stores an arbitrary value from 0 up until the priority as a phase, for each macro block. For example, in the case where the priority is 7, the map memory 138 stores arbitrary values from 0 to 6 as the phases of the macro blocks corresponding to this priority.

The intra-macro determination section 139 increments the value of the frame count N by only 1, each time image data of a new frame is to be encoded. The intra-macro determination section 139 sets the priority to a frequency, based on a frame count N, and the priority and phase stored in the map memory 138, and determines that the corresponding macro block is a forced intra-macro block. Namely, the intra-macro determination section 139 functions as an intra-block determination section, sets the priority to a frequency, based on the frame count N, the priority and the phase, and determines that the prediction mode of the macro block is an intra-prediction mode.

Specifically, the intra-macro determination section 139 divides the frame count N by the priority, and in the case where a remainder is the phase, the macro block corresponding to this priority and phase is set as a forced intra-macro block. For example, in the case where the priority is 7 and the phase is 6, the macro block corresponding to this priority and phase divides the frame count N by 7, and the macro block is set as a forced intra-macro block in the case where the remainder is 6. In this way, this macro block is set as a forced intra-macro block at a frequency of one time per 7 frames.

Further, in the case where a frame frequency of the encoding apparatus 21 is 30 Hz, a macro block having a priority of 30 is made a forced intra-macro block once every second (30 frames). In addition, a macro block having a priority of 1 may be normally set as a forced intra-macro block. The intra-macro determination section 139 supplies forced intra-macro information to the selection section 136.

The rate control section 140 controls the rate of quantization operations of the quantization section 125 so that an overflow or underflow is not generated, based on a video stream stored in the storage buffer 127.

[Description of the Return of a Decoded Image by a Forced Intra-macro Block]

Figure 2:
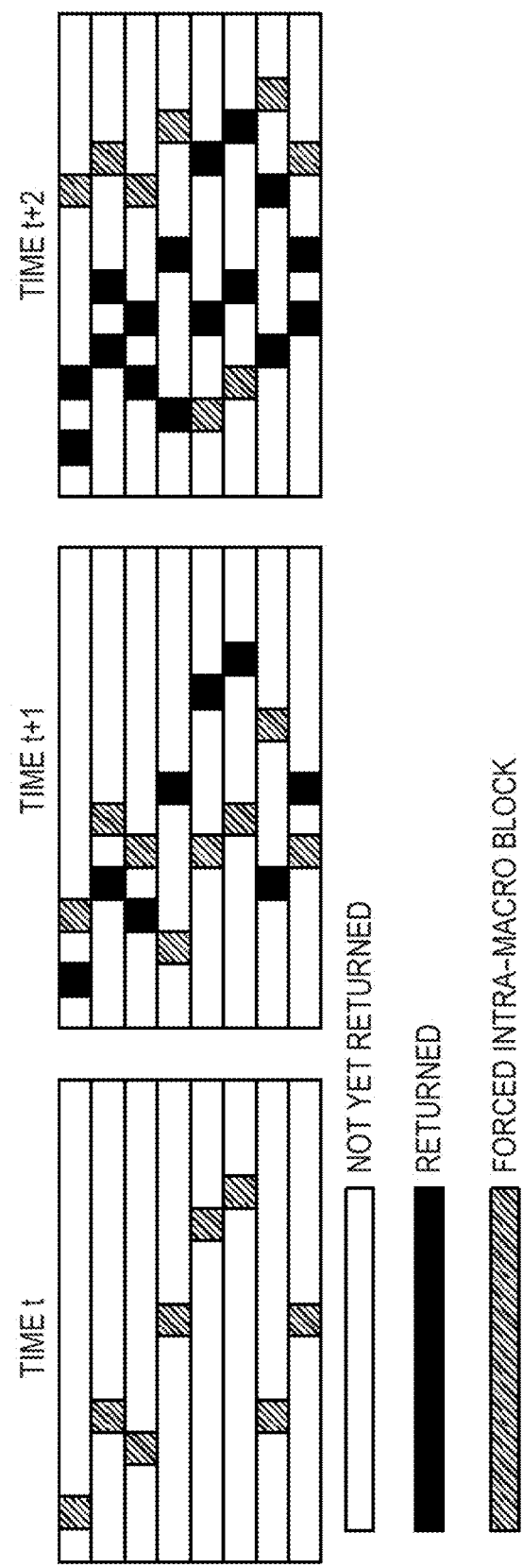
FIG. 2 is a figure describing the return of a decoded image by a forced intra-macro block.

FIG. 2 is a figure describing the return of a decoded image by a forced intra-macro block.

In the example of FIG. 2, macro blocks represented by squares with diagonal lines in the figure are set as forced intra-macro blocks in a frame of time t. In this case, even if a reception error occurs in the frame of time t−1, since pixels other than the macro block itself are not referred to in the intra-encoding, a decoded image of the forced intra-macro blocks of the frame of time t will be a normal image.

Then, when the macro blocks of a new position are set as forced intra-macro blocks in the frame of time t+1, similar to that of the frame of time t, the decoded image of these forced intra-macro blocks will be a normal image. Further, in the case where the forced intra-macro blocks of the frame of time t are intra-encoded, only the macro blocks themselves will be referred to, and in the case where the forced intra-macro blocks of the frame of time t are inter-encoded, macro blocks of positions similar to those of the macro blocks themselves of an immediately previous frame will be referred to. Therefore, in the frame of time t+1, a decoded image of the macro blocks set as forced intra-macro blocks in the frame of time t and time t+1 will be a normal image.

In addition, when the macro blocks of a new position are set as forced intra-macro blocks in the frame of time t+2, similar to that of the frame of time t+1, a decoded image of the macro blocks set as forced intra-macro blocks in time t, time t+1 and time t+2 will be a normal image.

In a similar way subsequently, macro blocks of normal decoded images increase, by assuming in every frame that macro blocks of a new position are forced intra-macro blocks, and the normal images will finally return. Note that at this time, macro blocks where the priority is high will return at an earlier time, compared to the time of macro blocks where the priority is low, since they are set as forced intra-macro blocks at a high frequency.

[Description of a Determination Method of a Priority]

Figure 3:
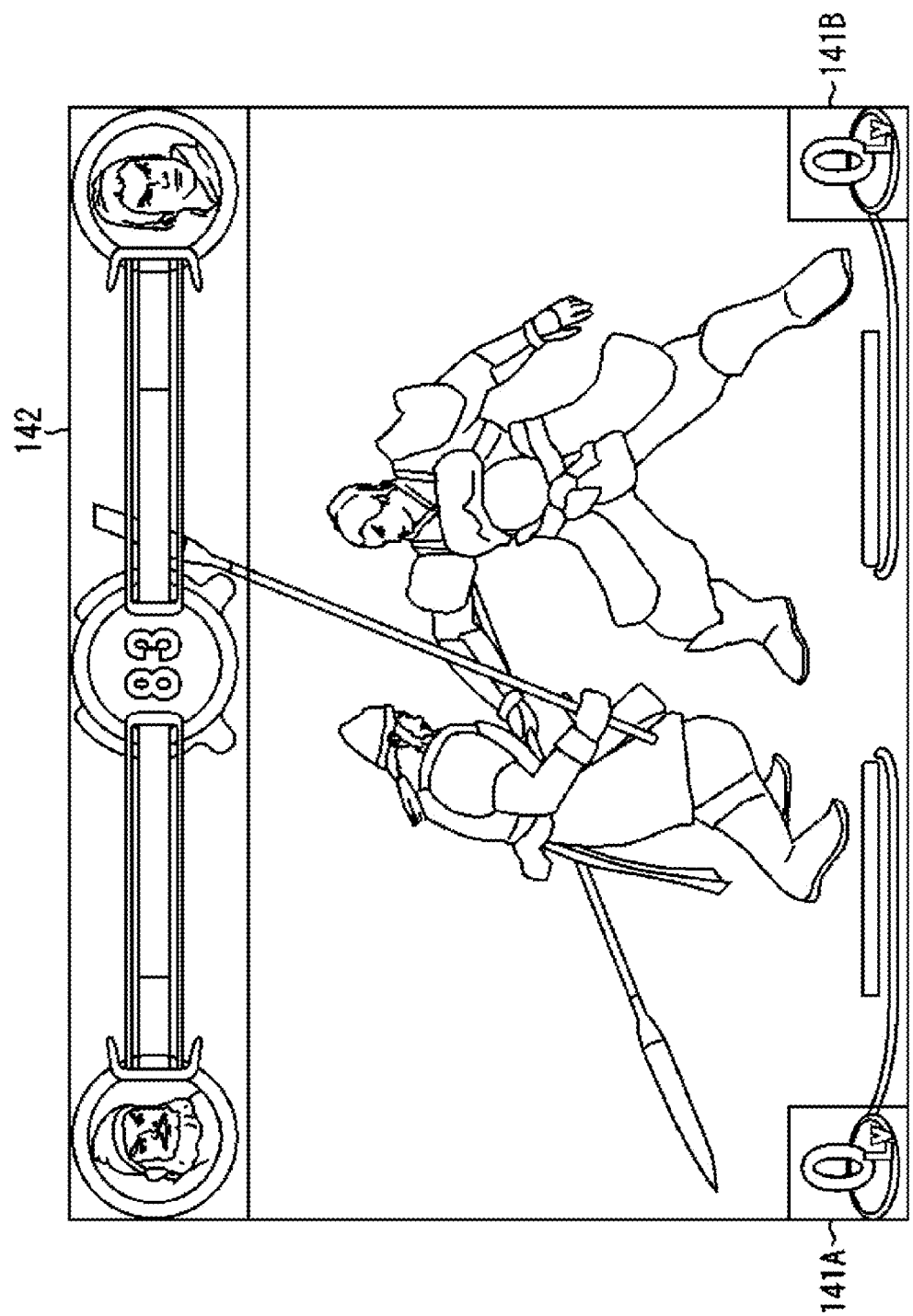
FIG. 3 is a figure describing a determination method of a priority.
Figure 4:
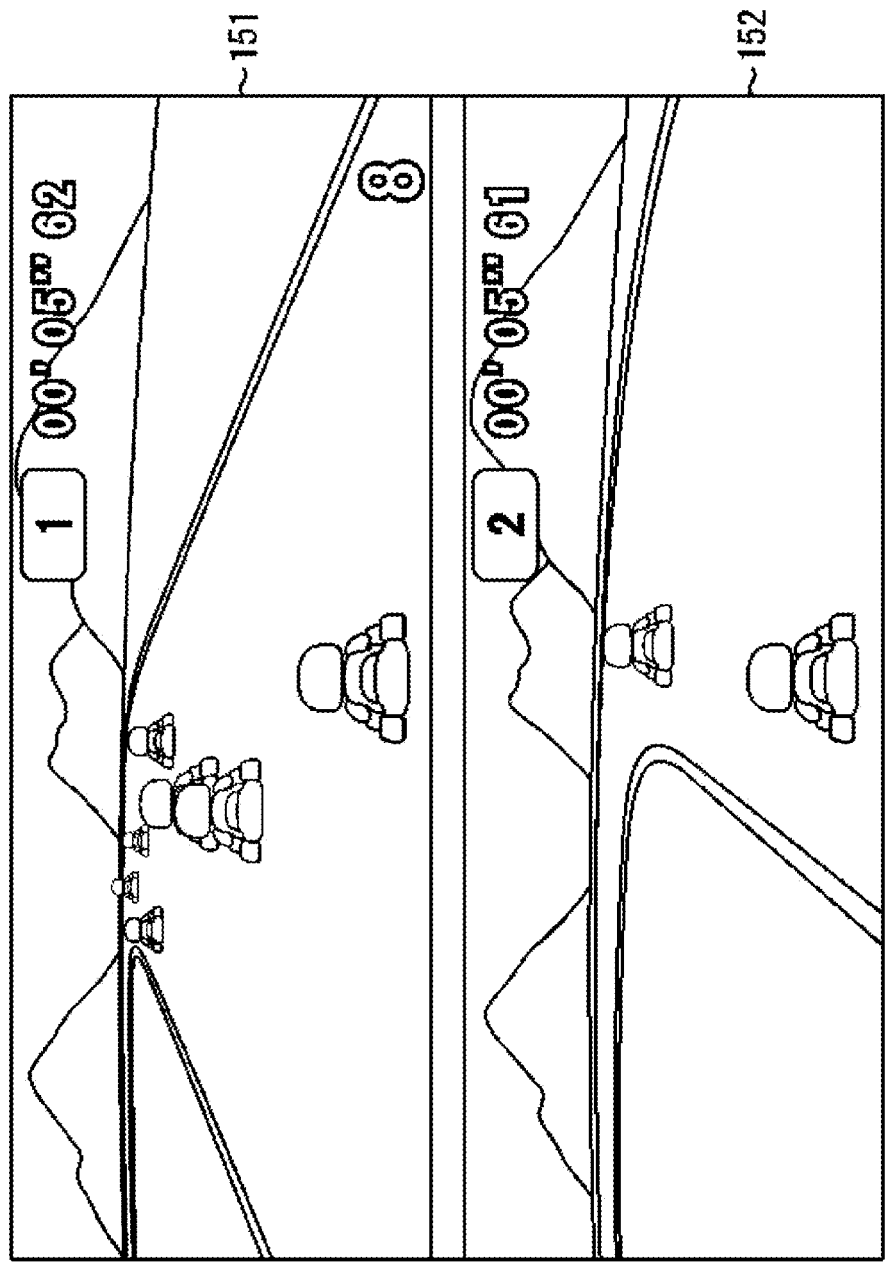
FIG. 4 is a figure further describing the determination method of a priority.

FIGS. 3 and 4 are figures describing a determination method of a priority.

As shown in FIG. 3, in the case where a type (genre) of an image to be encoded is an image of a combat game, level display regions 141A and 141B as well as a power gauge display region 142 will be regions that are frequently updated, and have a high degree of importance observed by a player. Therefore, in this case, the user of the encoding apparatus 21 inputs a high priority, compared to other regions, for the priority of the level display regions 141A and 141B as well as the power gauge display region 142.

In this way, the priority is determined, for example, in such a way that the priority of a region with a high update frequency increases in this image, in accordance with the type of image to be encoded.

Further, as shown in FIG. 4, in the case where the type of image to be encoded is an image including an upper-half region 151 displaying game content of the player themselves, and a lower-half region 152 displaying game content of another player, the upper-half region 151 will be a region having a high degree of importance observed by the player compared to the lower-half region 152. Therefore, in this case the user of the encoding apparatus 21 inputs a high priority, compared to the lower-half region 152, for the priority of the upper-half region 151.

In this way, the priority is determined, for example, in such a way that the priority of a prescribed region of the image (left-half region, right-half region, upper-half region, lower-half region, central region or the like) increases, in accordance with the type of image to be encoded.

[Description of the Process of the Encoding Section]

Figure 5:
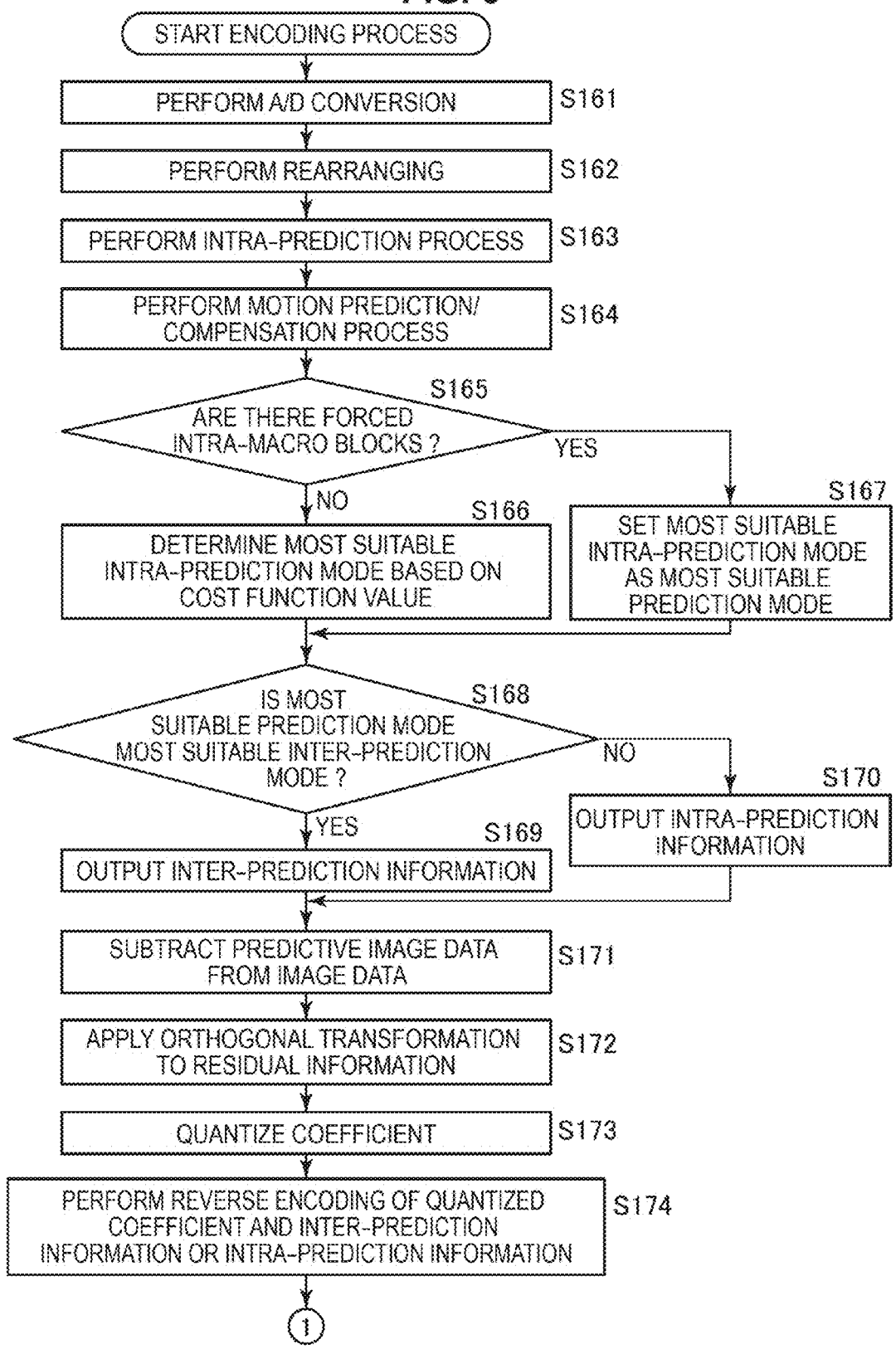
FIG. 5 is a flow chart describing an encoding process.
Figure 6:
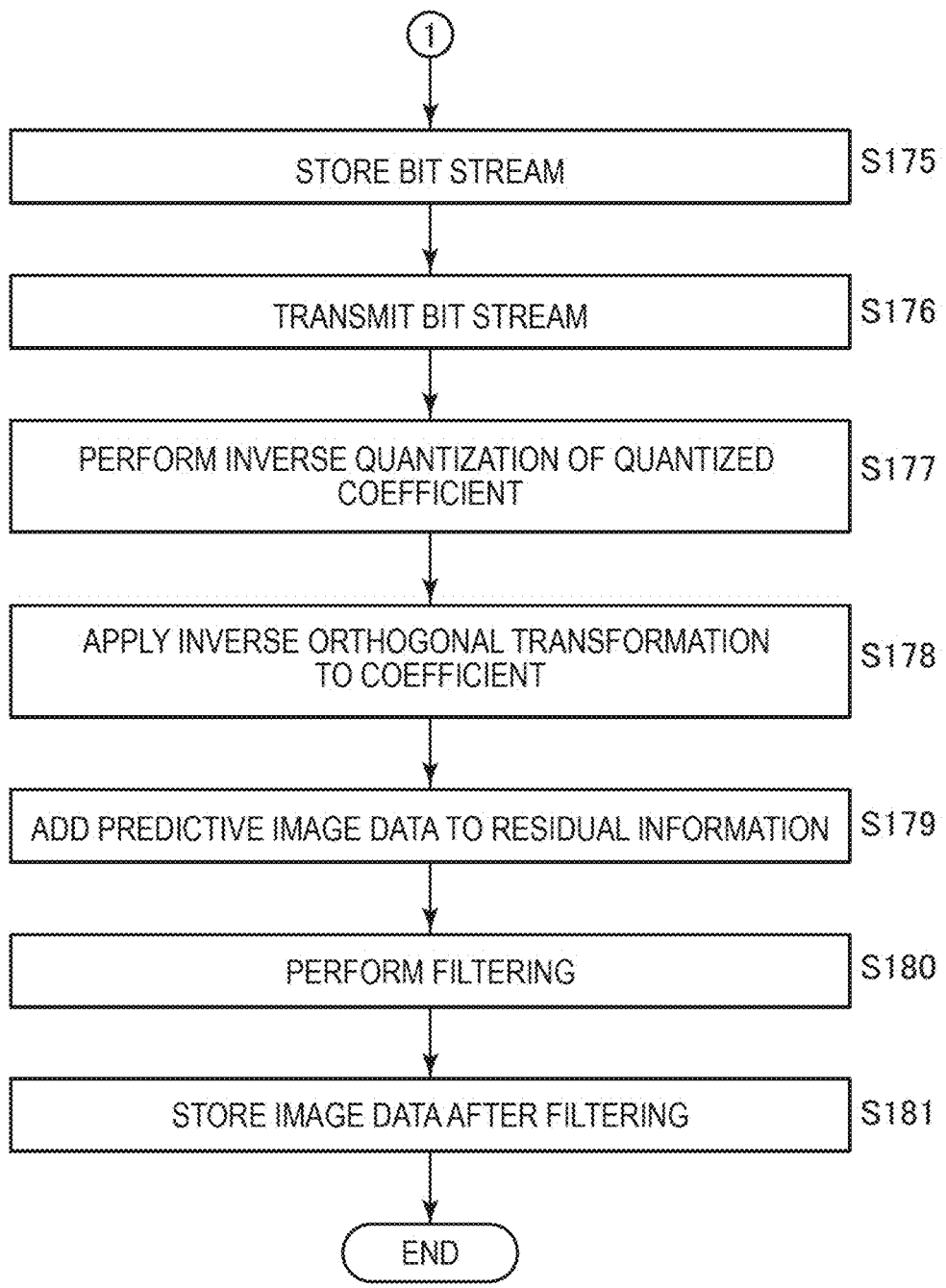
FIG. 6 is a flow chart further describing the encoding process.

FIGS. 5 and 6 are flow charts describing an encoding process of the encoding apparatus 21 of FIG. 1.

In step S161 of FIG. 5, the A/D conversion section 121 of the encoding apparatus 21 performs A/D conversion of image data of a frame unit input to be encoded, and outputs and stores the image data in the screen rearrangement buffer 122.

In step S162, the screen rearrangement buffer 122 rearranges the image data of the frame unit in an order of the stored display into an order for encoding, according to a GOP structure. The screen rearrangement buffer 122 supplies the image data of the frame unit after rearrangement to the computation section 123 and the motion prediction/ compensation section 135. The processes of the subsequent steps S163 to S181 are performed in a macro block unit, for example.

In step S163, the intra-prediction section 134 performs an intra-prediction process of all the candidate intra-prediction modes, by using reference image data supplied from the frame memory 132 through the switch 133. In this case, the intra-prediction section 134 calculates a cost function value for all the candidate intra-prediction modes. Then, the intra-prediction section 134 determines that an intra-prediction mode, to which the cost function value is minimized, is the most suitable intra-prediction mode. The intra-prediction section 134 supplies the predictive image data generated by the most suitable intra-prediction mode, and the corresponding cost function value, to the selection section 136.

In step S164, the motion prediction/compensation section 135 performs a motion prediction/compensation process, based on the image data supplied from the screen rearrangement buffer 122 and the reference image data supplied from the frame memory 132 through the switch 133. In this case, the motion prediction/compensation section 135 calculates a cost function value for all the candidate inter-prediction modes. Then, the motion prediction/compensation section 135 determines that an inter-prediction mode, to which the cost function value is minimized, is the most suitable inter-prediction mode. The motion prediction/compensation section 135 supplies the predictive image data generated by the most suitable inter-prediction mode, and the corresponding cost function value, to the selection section 136.

In step S165, the selection section 136 judges whether or not the macro block to be presently processed is a forced intra-macro block, based on the forced intra-macro information supplied from the intra-macro determination section 139.

In the case where the macro block to be presently processed is judged not to be a forced intra-macro block in step S165, the process proceeds to step S166. In step S166, the selection section 136 determines that one of the most suitable intra-prediction mode and the most suitable inter-prediction mode, to both of which a cost function value is minimized, is the most suitable prediction mode, based on the cost function value supplied from the intra-prediction section 134 and the motion prediction/compensation section 135. Then, the selection section 136 supplies the predictive image data of the most suitable prediction mode to the computation section 123 and the addition section 130, and the process proceeds to step S168.

Further, in the case where the macro block to be presently processed is judged to be a forced intra-macro block in step S165, the process proceeds to step S167.

In step S167, the selection section 136 sets the most suitable intra-prediction mode as the most suitable prediction mode, and the process proceeds to step S168.

In step S168, the selection section 136 judges whether or not the most suitable prediction mode is the most suitable inter-prediction mode. In the case where the most suitable prediction mode is judged to be the most suitable inter-prediction mode in step S168, the selection section 136 notifies the selection of the predictive image data generated by the most suitable inter-prediction mode to the motion prediction/compensation section 135.

Then, in step S169, the motion prediction/compensation section 135 outputs the inter-prediction information to the reversible encoding section 126, and the process proceeds to step S171.

On the other hand, in the case where the most suitable prediction mode is judged not to be the most suitable inter-prediction mode in step S168, namely, in the case where the most suitable prediction mode is the most suitable intra-prediction mode, the selection section 136 notifies the selection of the predictive image data generated by the most suitable intra-prediction mode to the intra-prediction section 134.

Then, in step S170, the intra-prediction section 134 outputs the intra-prediction information to the reversible encoding section 126, and the process proceeds to step S171.

In step S171, the computation section 123 subtracts the predictive image data supplied from the selection section 136 from the image data supplied from the screen rearrangement buffer 122. The computation section 123 outputs the image data obtained as a result of the subtraction to the orthogonal transformation section 124 as residual information.

In step S172, the orthogonal transformation section 124 applies an orthogonal transformation to the residual information from the computation section 123, and supplies a coefficient obtained as a result to the quantization section 125.

In step S173, the quantization section 125 quantizes the coefficient supplied from the orthogonal transformation section 124. The quantized coefficient is input to the reversible encoding section 126 and the inverse quantization section 128.

In step S174, the reversible encoding section 126 performs reverse encoding of the quantized coefficient supplied from the quantization section 128, and the inter-prediction information or the intra-prediction information. Then, the reversible encoding section 126 adds the reverse encoded inter-prediction information or the intra-prediction information as header information to the encoded data that is the reverse encoded coefficient, and generates a bit stream.

In step S175 of FIG. 6, the reversible encoding section 126 supplies and stores the bit stream in the storage buffer 127.

In step S176, the storage buffer 127 transmits the stored bit stream to a decoding apparatus (not shown) through a transmission route.

In step S177, the inverse quantization section 128 performs inverse quantization of the quantized coefficient supplied from the quantization section 125.

In step S178, the inverse orthogonal transformation section 129 applies an inverse orthogonal transformation to the coefficient supplied from the quantization section 128, and supplies the residual information obtained as a result to the addition section 130.

In step S179, the addition section 130 adds the predictive image data supplied from the selection section 136 to the residual information supplied from the inverse orthogonal transformation section 129, and obtains partially decoded image data. The addition section 130 supplies the obtained image data to the deblock filter 131.

In step S180, the deblock filter 131 removes block distortions by filtering the partially decoded image data supplied from the addition section 130.

In step S181, the deblock filter 131 supplies and stores the image data after filtering to the frame memory 132. The image data stored in the frame memory 132 is output to the intra-prediction section 134 or the motion prediction/compensation section 135 through the switch 133 as reference image data. Then, the process ends.

Note that in the encoding processes of FIGS. 5 and 6, while an intra-prediction process and a motion compensation process are normally performed so as to simplify the description, there are cases where only one of the processes is actually performed by a picture type or the like.

Figure 7:
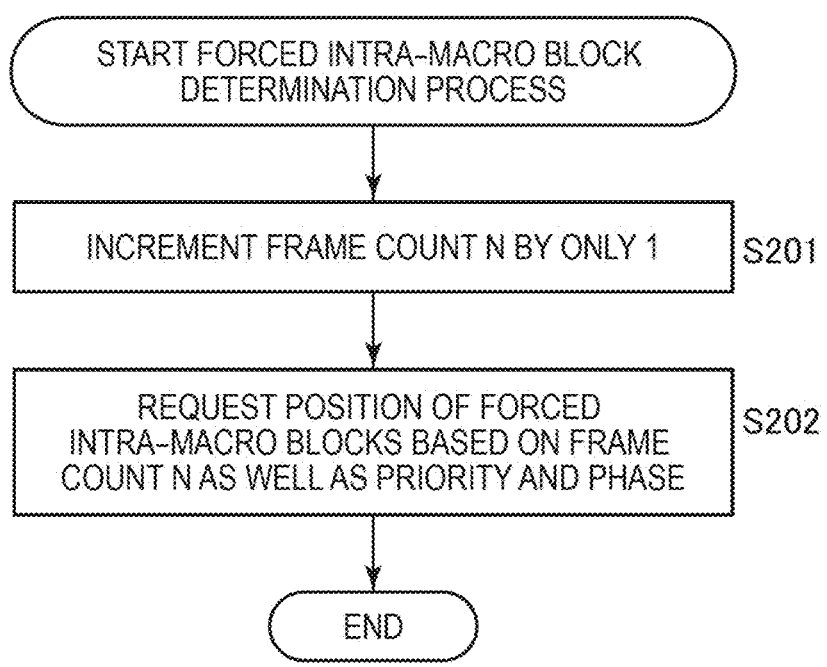
FIG. 7 is a flow chart describing a forced intra-macro block determination process.

FIG. 7 is a flow chart describing a forced intra-macro block determination process of the intra-macro determination section 139 of FIG. 1. This forced intra-macro block determination process is performed, for example, whenever image data of a frame unit to be encoded is input to the encoding apparatus 21.

In step S201, the intra-macro determination section 139 increments the frame count N by only 1. Note that the initial value of the frame count N is 0.

In step S202, the intra-macro determination section 139 requests the positions of the macro blocks set as forced intra-macro blocks, based on the frame count N as well as the priority and phase of each macro block stored in the map memory 138. The intra-macro determination section 139 supplies forced intra-macro information showing these positions to the selection section 136. Then, the process ends.

As shown above, the encoding apparatus 21 of FIG. 1 sets the priority of each macro block of the image to be encoded as a frequency, and determines that the prediction mode of the macro blocks is a forced intra-prediction mode. In this way, a macro block where the priority is high is frequently set as a forced intra-macro block. As a result, in the case where an error occurs on the decoding side, macro blocks with a high priority within the decoded image, that is, macro blocks with a high degree of importance, can be quickly returned.

<The Second Embodiment>
[Configuration Example of the Encoding Apparatus]

Figure 8:
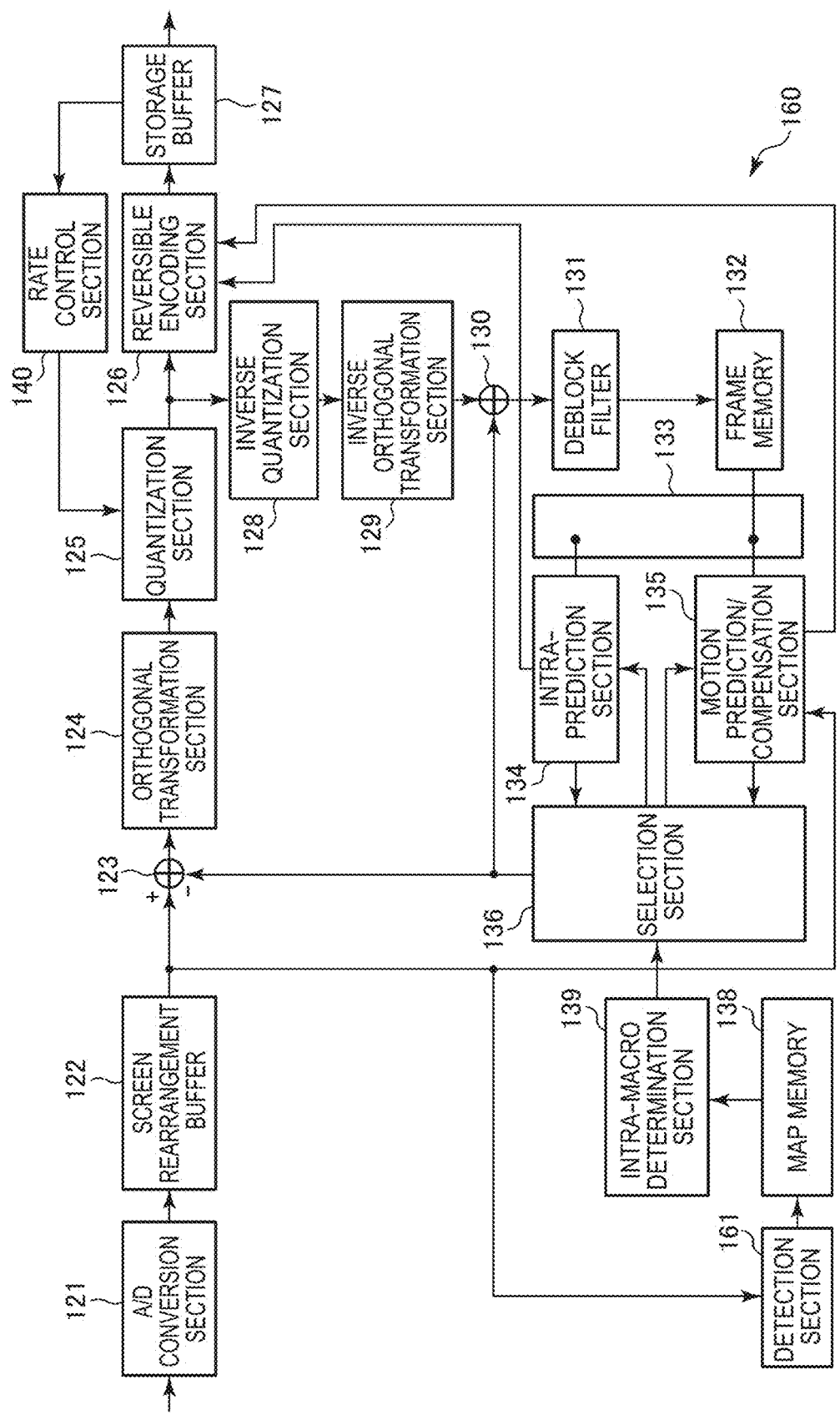
FIG. 8 is a figure showing a configuration example of a second embodiment of an encoding apparatus applicable to the present disclosure.

FIG. 8 is a figure showing a configuration example of a second embodiment of an encoding apparatus applicable to the present disclosure.

Within the structural elements shown in FIG. 8, the same reference numerals are attached to structural elements similar to those of FIG. 1. Repeated explanations will be appropriately omitted.

The configuration of the encoding apparatus 160 of FIG. 8 differs from the configuration of FIG. 1 in that a detection section 161 is included in place of the reception section 137. The encoding apparatus 160 of FIG. 8 determines the priority of each macro block, based on a motion vector of the image data of the frame unit to be encoded.

Specifically, the detection section 161 of the encoding apparatus 160 functions as a priority determination section, and by using the image data of the frame unit to be encoded output from the screen rearrangement buffer 122, detects a motion vector of each macro block of this image data. The detection section 161 determines the priority of each block, so that the more the motion vector increases, the more the priority increases (the value of the priority becomes smaller), based on the detected motion vector of each macro block. The detection section 161 supplies and stores the determined priority in the map memory 138.

As shown above, since the encoding apparatus 160 determines the priority based on a motion vector, as the motion increases, the priority of a macro block, which is to be quickly returned at the time of an error occurring, also increases, and this macro block can be quickly returned.

<The Third Embodiment>
[Configuration Example of the Encoding Apparatus]

Figure 9:
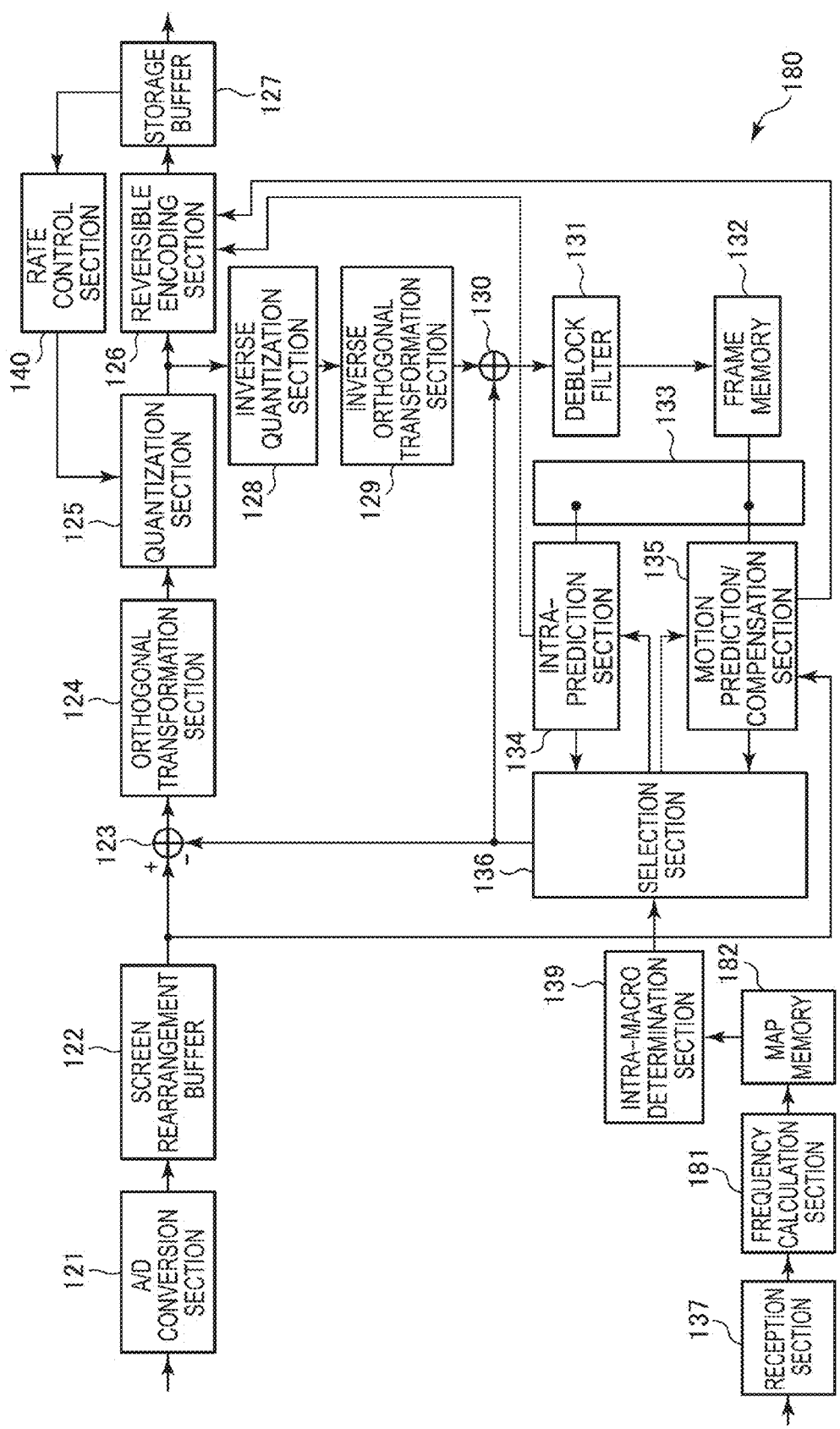
FIG. 9 is a figure showing a configuration example of a third embodiment of an encoding apparatus applicable to the present disclosure.

FIG. 9 is a figure showing a configuration example of a third embodiment of an encoding apparatus applicable to the present disclosure.

Within the structural elements shown in FIG. 9, the same reference numerals are attached to structural elements similar to those of FIG. 1. Repeated explanations will be appropriately omitted.

The configuration of the encoding apparatus 180 of FIG. 9 differs from the configuration of FIG. 1 in that a new frequency calculation section 181 is included, and a map memory 182 is included in place of the map memory 138. The encoding apparatus 180 of FIG. 9 statistically processes the priority of each macro block, and calculates a frequency for the macro blocks set as forced intra-macro blocks, based on the priority after statistical processing.

Specifically, the frequency calculation section 181 of the encoding apparatus 180 generates a histogram as the statistical process for the priority output from the reception section 137, and based on this histogram, calculates a frequency for each of the macro blocks set as forced intra-macro blocks. Then, the frequency calculation section 181 supplies these frequencies to the map memory 182.

The map memory 182 stores the frequencies supplied from the frequency calculation section 181 for each macro block. Further, the map memory 182 stores an arbitrary value from 0 up until the priority as a phase for each macro block. For example, in the case where the frequency is 7, the map memory 182 stores an arbitrary value of 0 to 6 as the phase of the macro block corresponding to this frequency.

[Calculation Method of the Frequency]

Figure 10:
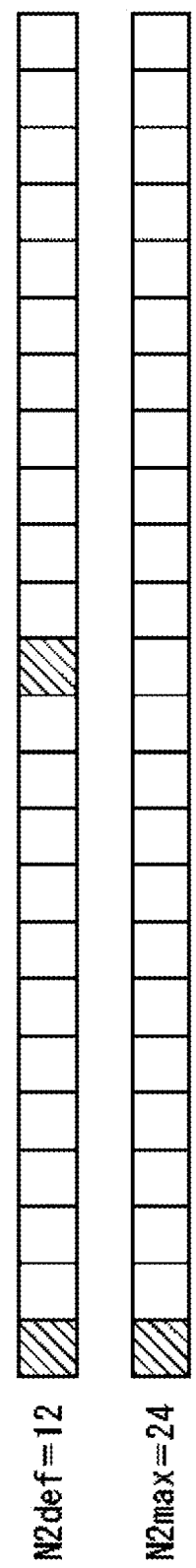
FIG. 10 is a figure describing a calculation method of a frequency by a frequency calculation section.
Figure 11:
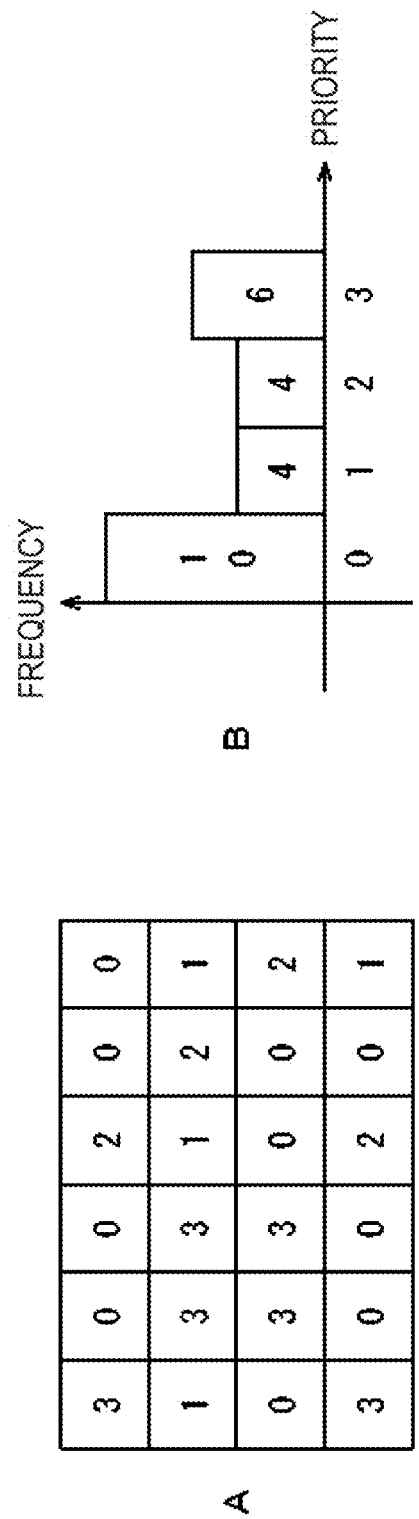
FIG. 11 is a figure further describing the calculation method of a frequency by the frequency calculation section.

FIGS. 10 and 11 are figures describing a calculation method of the frequency by the frequency calculation section 181.

The frequency calculation section 181 first calculates a total of the forced intra-macro blocks (hereinafter called an intra MB total) within a maximum updated frame cycle N2max, using a standard update frame cycle N2def and a total of the macro blocks (hereinafter called an MB number) within the screen, by the following Equation (3).

Note that the standard update frame cycle N2def is an average update frequency of the forced intra-macro blocks, and is a default value of an IDR picture interval of an AVC system, for example. Further, the maximum updated frame cycle N2max is a maximum value of an interval of the forced intra-macro blocks set beforehand, and each macro block is set as a forced intra macro-block one or more times in the maximum updated frame cycle N2max.

$$\text{Intra MB total} = \text{MB number} \times (N2\text{max}/N2\text{def}) \qquad (3)$$

For example, as shown in FIG. 10, in the case where the standard update frame cycle N2def is 12 frames and the maximum updated frame cycle N2max is 24 frames, the intra MB total becomes 2 (=24/12) times the MB number. Note that in FIG. 10 the squares represent the prescribed macro blocks of each frame, and in the case where there are squares with diagonal lines, the macro blocks represented by these squares are forced intra-macro blocks.

Next, the frequency calculation section 181 generates a histogram of priority. For example, as shown in FIG. 11A, in the case where the priority of each macro block has been determined, the frequency calculation section 181 generates the histogram shown in FIG. 11.

Note that in FIG. 11A the squares represent the macro blocks, and the numerals within the squares represent a priority of the macro block represented by this square. In the example of FIG. 11, one screen includes 4×6 macro blocks, and a priority of 0 to 3 is set for each macro block. Further, in the histogram shown in FIG. 11B, a frequency of the priority 0 is 10, a frequency of both the priority 1 and the priority 2 is 4, and a frequency of the priority 3 is 6.

Then, in order for the number of forced intra-macro blocks (hereinafter called a requested macro block number), requested within the maximum updated frame cycle N2max, of the macro blocks with a high priority to increase, the frequency calculation section 181 calculates a requested macro block number using a priority index corresponding to each priority. Specifically, the frequency calculation section 181 multiplies the priority index of the priorities by the frequency of each priority in the generated histogram, and assumes that the multiplied value obtained as a result is a requested macro block number.

For example, if it is assumed that the priority index of the priorities 0 to 3 is 1 to 4, the requested macro block number of the priority 0, in the case of FIG. 11, is 10 (=10×1), and the requested macro block number of the priority 1 is 8 (=4×2). Further, the requested macro block number of the priority 2 is 12 (=4×3), and the requested macro block number of the priority 3 is 24 (=6×4).

Next, the frequency calculation section 181 determines the frequency set as a forced intra-macro block for each priority, based on the requested macro block number. Specifically, the frequency calculation section 181 first distributes one intra MB total to each macro block, and calculates a residual number. For example, in the case where the intra MB total is 48, such as in the case of FIG. 10, and where the MB number is 24 (=4×6), such as in the case of FIG. 11, the residual number will be 24 (=48−24).

Further, since one intra MB total is distributed to each macro block, the frequency calculation section 181 subtracts 1× frequency part from the requested macro block number of each priority. In this way, in the case of FIG. 11, the requested macro block numbers of the priorities 0 to 3 will become 0 (=10−1×10), 4 (=8−1×4), 8 (=12−1×4) and 18 (=24−1×6), respectively.

Then, the frequency calculation section 181 distributes a residual number to each priority, in accordance with the requested macro block number after subtraction, by the following Equation (4).

$$\text{Distribution number} = (\text{residual number}/\text{total of the requested macro block numbers after subtraction of all priorities}) \times \text{requested macro block number after subtraction} \quad (4)$$

For example, in the case where the residual number shown above is 24, and the requested macro block number of the priorities 0 to 3 after subtraction are 0, 4, 8 and 18, the distribution numbers of the priorities 0 to 3 will be 0 (=24/(0+4+8+18))×0), 3 (≈(24/(0+4+8+18))×4), 6 (≈(24/(0+4+8+18))×8), and 14 (≈(24/(0+4+8+18))×18), respectively.

Then, the frequency calculation section 181 adds 1, initially distributed to each macro block, to the distribution number of each priority requested by the above Equation (4), and sets the final distribution number, by the following Equation (5).

$$\text{Final distribution number} = \text{distribution number} + 1 \times \text{frequency} \quad (5)$$

For example, in the case where the distribution numbers of the priorities 0 to 3 shown above are 0, 3, 6 and 14, as in the histogram shown in FIG. 11, the final distribution numbers of the priorities 0 to 3 will be 10 (=0+1×10), 7 (=3+1×4), 10 (=6+1×4), and 20 (=14+1×6), respectively.

Finally, the frequency calculation section 181 calculates the frequency set as a forced intra-macro block, from the final distribution number of each priority, by the following Equation (6).

$$\text{Frequency} = N2\text{max}/(\text{final distribution number}/\text{frequency}) \quad (6)$$

For example, in the case where the final distribution number of the priorities 0 to 3 are 10, 7, 10 and 20, respectively, the frequencies of the priorities 0 to 3 will be 24 (=24/(10/10)), 14 (≈24/(7/4)), 10 (≈24/(10/4)), and 8 (≈24/(20/6)).

[Description of the Processes of the Encoding Apparatus]

Next, the processes of the encoding apparatus 180 will be described. Since the encoding process of the encoding apparatus 180 is similar to the encoding process of FIGS. 5 and 6, the description of this will be omitted. Further, since the forced intra-macro block determination process of the encoding apparatus 180 is similar to the forced intra-macro block determination process of FIG. 7, excluding the point of the priority taking the place of the frequency, the description of this will be omitted.

Figure 12:
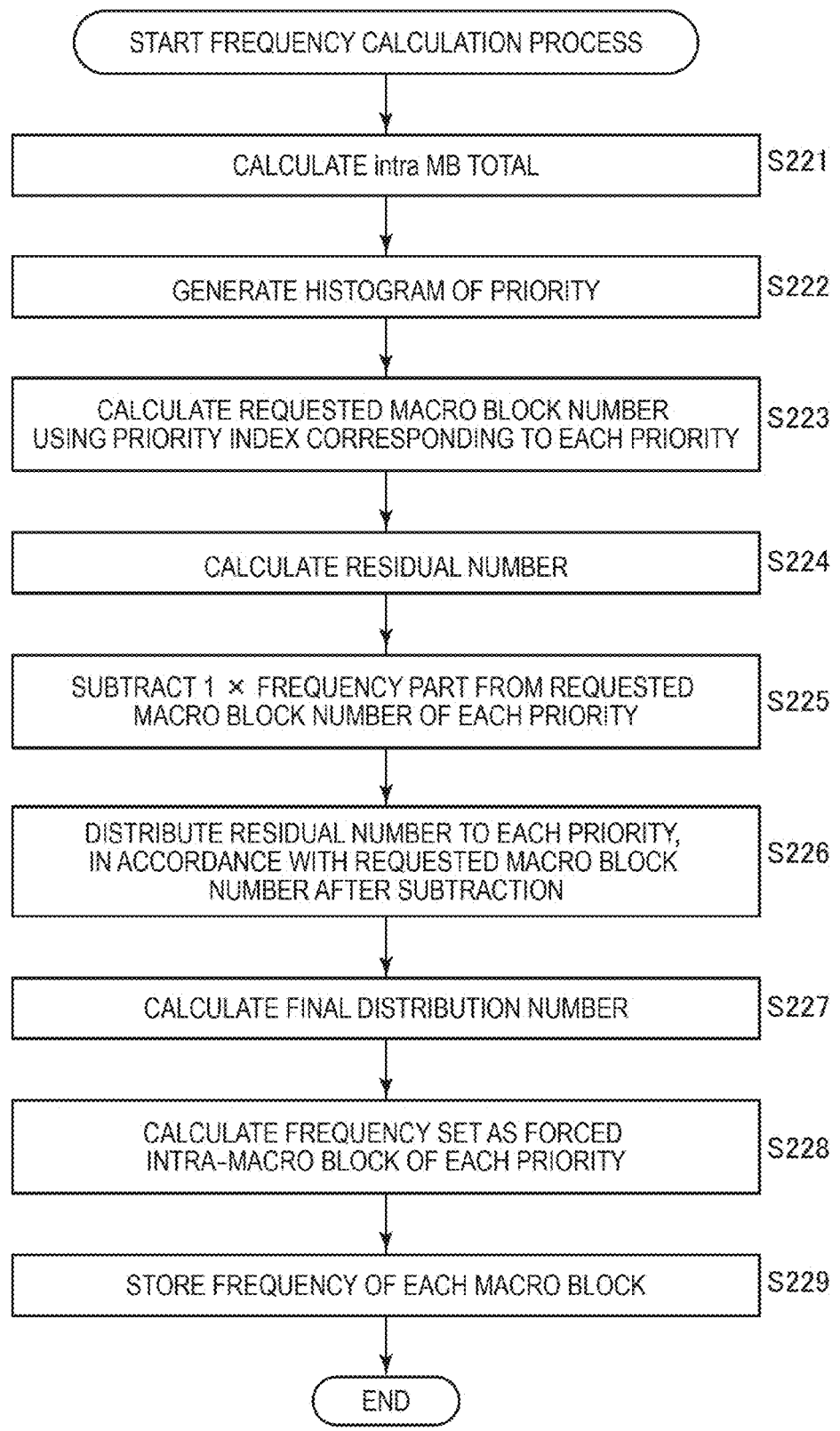
FIG. 12 is a flow chart describing a frequency calculation process.

FIG. 12 is a flow chart describing a frequency calculation process of the frequency calculation section 181 of the encoding apparatus 180.

In step S221 of FIG. 12, the frequency calculation section 181 calculates the intra MB total, by the above mentioned Equation (3).

In step S222, the frequency calculation section 181 generates a histogram of priority. In step S223, the frequency calculation section 181 calculates a requested macro block number using a priority index corresponding to each priority, so that the requested macro block number of the macro blocks with a high priority increases.

In step S224, the frequency calculation section 181 distributes one intra MB total to each macro block, and calculates a residual number. In step S225, the frequency calculation section 181 subtracts 1× frequency part from the requested macro block number of each priority. In step S226, the frequency calculation section 181 distributes a residual number to each priority, in accordance with the requested macro block number after subtraction, by the above mentioned Equation (4).

In step S227, the frequency calculation section 181 calculates the final distribution number, by the above mentioned Equation (5).

In step S228, the frequency calculation section 181 calculates the frequency set as a forced intra-macro block for each priority, from the final distribution number of each priority, by the above mentioned Equation (6).

In step S229, the frequency calculation section 181 supplies and stores the frequency set as a forced intra-macro block for each macro block in the map memory 182, according to the priority of each macro block. Then, the process ends.

Note that the calculation method of the requested intra-macro block number, in the case where is a calculation method in which the requested macro block number of macro blocks with a high priority increases, is not limited to the above mentioned calculation method. Further, the distribution method of the intra MB total is not limited to the above mentioned distribution method.

Further, in the above description, while the prediction mode of prescribed macro blocks of the image to be encoded is set as a forced intra-prediction mode, the unit to which the prediction mode is set as a forced intra-prediction mode may be not be a macro block but a slice. In this case, the priority is decided in this unit.

In addition, the frequency set as a forced intra-macro block may be determined based on priority information showing the priority, and not by the priority itself. In this case, a value of −1 to 16 is set as the priority information, for example, and the priority information 16 represents the highest priority, and the priority information 0 represents the lowest priority. Further, the priority information −1 represents not setting forced intra-macro blocks, and represents normally setting forced intra macro blocks.

Further, the phase may be sequentially allocated from 0, not with a prescribed value, but in a scanning order of macro blocks of the same priority, for example.

In addition, information other than the priority (frequency) and phase may be recorded in a macro block unit in the map memory 138 (182). In this case, the positions of forced intra-macro blocks are determined based on information other than the priority (frequency) and phase.

Further, the reception section 137 is not only an input of the priority of each macro block from the user, but may also receive an input of image data of a pattern image corresponding to the priority. In this case, the reception section 137 compares the image data to be encoded output from the screen rearrangement buffer 122 with the image data of the pattern image, and outputs a priority corresponding to the most similar pattern image. In this way, the user can more easily input a priority, without the need to input the priority of all the frames.

Further, the encoding system according to an embodiment of the present disclosure, besides an AVC system, may be an MPEG (Moving Picture Experts Group Phase) system, or an HEVC system in which the encoding efficiency is better compared to that of an AVC system.

In the case where the encoding system is an HEVC system, for example, the intra-prediction modes of a brightness signal, in which the size of prediction blocks is 8×8, are 34 intra-prediction modes of the intra-prediction modes showing an intra-prediction mode of 33 directions, shown in FIG. 13, and a DC Prediction. Further, in the intra-prediction modes of the brightness signal, in which the sizes of prediction blocks are 16×16 pixels, 32×32 pixels, and 64×64 pixels, the mode number is 33, according to the coordinates (dxIntra, dxIntra), as shown in FIG. 14. Note that the coordinates (dxIntra, dxIntra) represent the position for a base pixel of endpoints other than the base pixel of the prescribed coordinates (x, y) of a line where pixels used as predictive pixels of adjacent blocks adjacent to the prediction block intersect. That is, the pixels used as predictive pixels of adjacent blocks intersect with a line connecting the position of the coordinates (x+dxIntra, y+dyIntra) with the base pixel.

Further, while the reference image data is constrained, such as the decoded image of a macro block returned once being continued as normal in the above mentioned embodiments as shown in FIG. 2, the constraint of the reference image data is not limited to this. Further, the reference image data may be used, without constraint, in the encoding systems of the related art.

<The Fourth Embodiment>
[Description of a Computer Applicable to the Present Disclosure]

The above mentioned series of processes can be executed by hardware, or can be executed by software. In the case where the series of processes is executed by software, a program configuring this software is installed in a computer. Here, for example, a general purpose personal computer that can execute various functions is included in the computer, by installing a computer incorporated into specialized hardware and various programs.

Figure 15:
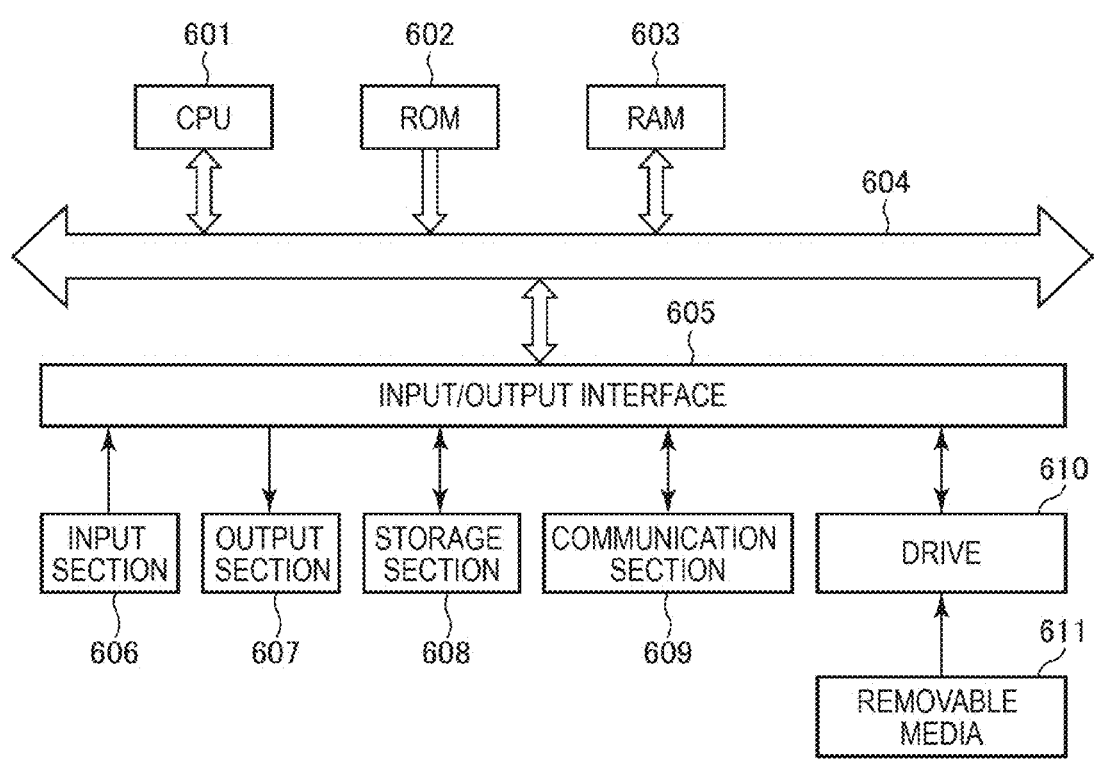
FIG. 15 is a block diagram showing a configuration example of hardware of a computer.

FIG. 15 is a block diagram showing a configuration example of hardware of a computer executing the above series of processes by a program.

A CPU (Central Processing Unit) 601, a ROM (Read Only Memory) 602, a RAM (Random Access memory) 603, and a bus 604 are mutually connected in the computer.

An input/output interface 605 is further connected to the bus 604. An input section 606, an output section 607, a storage section 608, a communications section 609, and a drive 610 are connected to the input/output interface 605.

The input section 606 includes a keyboard, a mouse, a microphone or the like. The output section 607 includes a display, a speaker or the like. The storage section 608 includes a hard disk, a nonvolatile memory or the like. The communications section 609 includes a network interface or the like. The drive 610 drives a removable media 611, such as a magnetic disk, an optical disk, a magneto-optical disk, or a semiconductor memory.

In a computer configured such as above, the above mentioned series of processes are executed, for example, by the CPU 601 loading and executing a program, which is stored in the storage section 608, in the RAM 603 through the input/output interface 605 and the bus 604.

The program executed by the computer (CPU 601) can be, for example, recorded and provided in a removable media 611 as packaged media or the like. Further, the program can be provided through a wired or wireless transmission medium, such as a local area network, the internet, or digital satellite broadcasting.

In the computer, the program can be installed in the storage section 608 through the input/output interface 605, by installing the removable media 611 in the drive 610. Further, the program can be received by the communications section 609 through the wired or wireless transmission medium, and can be installed in the storage section 608. Additionally, the program can be installed beforehand in the ROM 602 and the storage section 608.

Note that the program executed by the computer may be a program which performs time series processes, in accordance with the order described in the present disclosure, or may be a program which performs the processes at a necessary timing in parallel, such as when calling is performed.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

It should be understood by those skilled in the art that various modifications, combinations, sub-combinations and alterations may occur depending on design requirements and other factors insofar as they are within the scope of the appended claims or the equivalents thereof.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below.

(1) An encoding apparatus, including:
an intra-block determination section which determines that a prediction mode of a block is a forced intra-prediction mode, by a frequency based on a priority of each block of an image to be encoded;
an encoding section which encodes the block, to which the prediction mode has been determined to be an intra-prediction mode by the intra-block determination section, with the intra-prediction mode; and
a transmission section which transmits an encoded result of the image to be encoded obtained by the encoding section, and the prediction mode of the image.

(2) The encoding apparatus according to (1), further including:
a reception section which receives an input of the priority from a user.

(3) The encoding apparatus according to (1) or (2),
wherein the priority is determined according to a type of the image to be encoded.

(4) The encoding apparatus according to any one of (1) to (3),
wherein the priority is determined in a manner that the priority of the block with a high update frequency increases.

(5) The encoding apparatus according to any one of (1) to (3),
wherein the priority is determined in a manner that the priority of the block of a left-half region, a right-half region, an upper-half region, a lower-half region or a central region of a screen of the image to be encoded increases.

(6) The encoding apparatus according to (1), further including:
a priority determination section which detects a motion vector of the block, and determines the priority in a manner that the more the motion vector of the block increases, the more the priority increases.

(7) The encoding apparatus according to any one of (1) to (6),
wherein the intra-block determination section sets the priority as the frequency.

(8) The encoding apparatus according to any one of (1) to (6), further including:
a frequency calculation section which statistically processes the priority, and calculates the frequency based on the priority after statistical processing,
wherein the intra-block determination section determines that the prediction mode of the block is a forced intra-prediction mode, by the frequency calculated by the frequency calculation section.

(9) An encoding method of an encoding apparatus, including:
determining that a prediction mode of a block is a forced intra-prediction mode, by a frequency based on a priority of each block of an image to be encoded;
encoding the block, to which the prediction mode has been determined to be an intra-prediction mode by the process of intra-block determination, with the intra-prediction mode; and
transmitting an encoded result of the image to be encoded obtained by the process of encoding, and the prediction mode of the image.

(10) A program for causing a computer to function as:
an intra-block determination section which determines that a prediction mode of a block is a forced intra-prediction mode, by a frequency based on a priority of each block of an image to be encoded;
an encoding section which encodes the block, to which the prediction mode has been determined to be an intra-prediction mode by the intra-block determination section, with the intra-prediction mode; and
a transmission control section which controls transmission of an encoded result of the image to be encoded obtained by the encoding section, and the prediction mode of the image.

The present disclosure contains subject matter related to that disclosed in Japanese Priority Patent Application JP 2011-232747 filed in the Japan Patent Office on Oct. 24, 2011, the entire content of which is hereby incorporated by reference.

What is claimed is:

1. An encoding apparatus, comprising:
an encoding section which encodes a block of a region, for which a prediction mode has been determined to be an intra-prediction mode based on an update frequency of the region in an image to be encoded, with the intra-prediction mode, wherein the update frequency of the region is based on a degree of importance of the region in the image; and
a transmission section which transmits an encoded result of the image to be encoded obtained by the encoding section, and the prediction mode of the image.

2. The encoding apparatus according to claim 1, further comprising:
an intra-block determination section which determines that the prediction mode of the block is the intra-prediction mode based on the update frequency.

3. The encoding apparatus according to claim 2,
wherein the intra-block determination section determines that the prediction mode of the block of the region with the high update frequency is the intra-prediction mode.

4. The encoding apparatus according to claim 3,
wherein the intra-block determination section determines that the prediction mode of the block of the region with the high update frequency is the intra-prediction mode according to a type of the image to be encoded.

5. The encoding apparatus according to claim 3,
wherein the region with the high update frequency is an observed region of a user.

6. The encoding apparatus according to claim 2,
wherein the intra-block determination section determines that the prediction mode of the block of the region is the intra-prediction mode by a frequency based on a high update frequency.

7. The encoding apparatus according to claim 6,
wherein the frequency is the frequency of a frame of the image to be encoded which includes a block, for which the prediction mode has been determined to be the intra-prediction mode.

8. An encoding method of an encoding apparatus comprising:
encoding a block of a region, for which a prediction mode has been determined to be an intra-prediction mode based on an update frequency of the region in an image to be encoded, with the intra-prediction mode, wherein the update frequency of the region is based on a degree of importance of the region in the image; and
transmitting an encoded result of the image to be encoded and the prediction mode of the image.

9. A decoding apparatus, comprising:
an decoding section which decodes an encoded stream, for which a prediction mode of a block has been determined to be an intra-prediction mode based on a priority of each block in an image to be decoded, with the intra-prediction mode, wherein the priority is determined to increase in the block of the region with a high update frequency in the image to be decoded and wherein the update frequency of the region is based on a degree of importance of the region in the image; and an output section which outputs a decoded result of the image to be decoded obtained by the decoding section.

10. The decoding apparatus according to claim 9, wherein the priority is determined to increase in the block of the region with a high update frequency in the image to be encoded according to a type of the image to be encoded.

11. A decoding method of a decoding apparatus, comprising:

decoding an encoded stream, for which a prediction mode of a block has been determined to be an intra-prediction mode based on a priority of each block in an image to be decoded, with the intra-prediction mode, wherein the priority is determined to increase in the block of the region with a high update frequency in the image to be decoded and wherein the update frequency of the region is based on a degree of importance of the region in the image; and outputting a decoded result of the image to be decoded.

\* \* \* \* \*